July 25, 1939.  R. M. BOWIE  2,167,431
METHOD OF MANUFACTURING CATHODE RAY TUBES
Filed Aug. 14, 1936
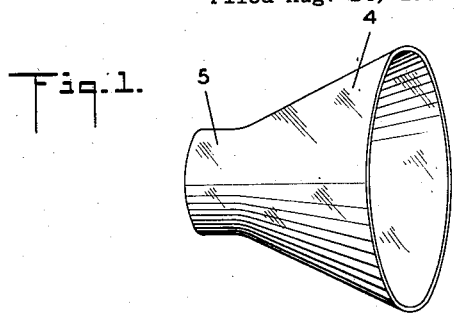
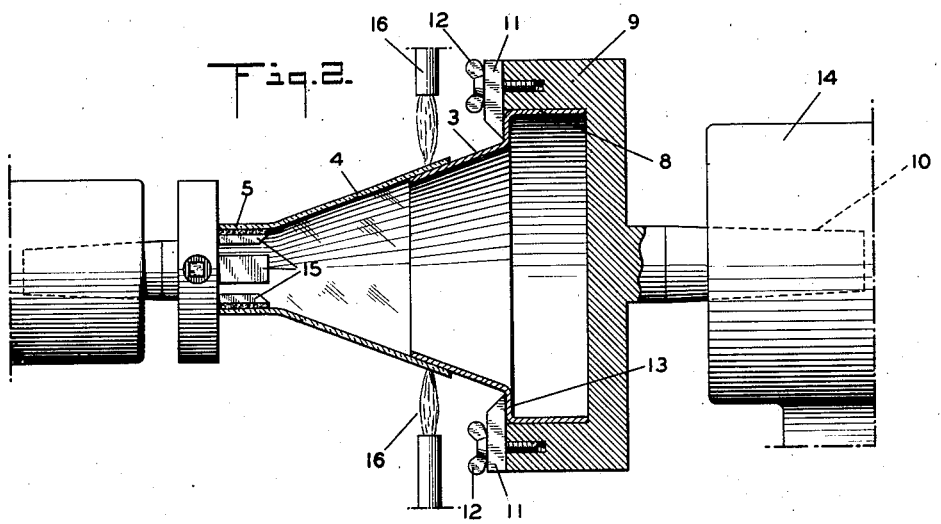
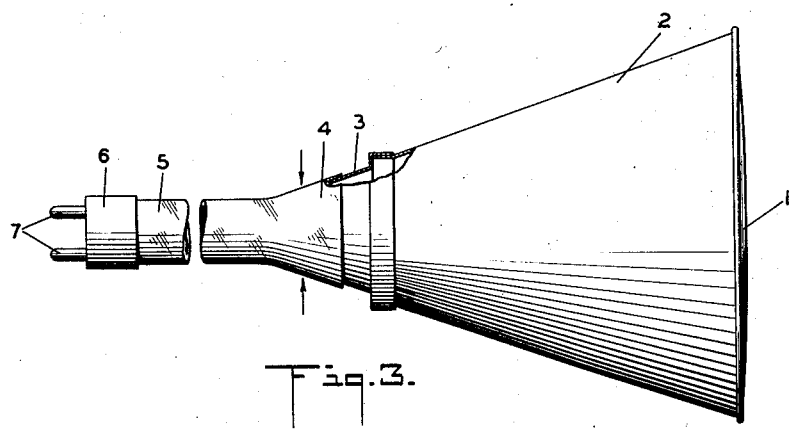
Robert M. Bowie
INVENTOR
BY John J. Rogan
ATTORNEY Patented July 25, 1939

2,167,431

UNITED STATES PATENT OFFICE 2,167,431

METHOD OF MANUFACTURING CATHODE RAY TUBES

Robert M. Bowie, Emporium, Pa., assignor to Hygrade Sylvania Corporation, Salem, Mass., a corporation of Massachusetts Application August 14, 1936, Serial No. 95,969

3 Claims. (Cl. 250—27.5)

This invention relates to cathode-ray tubes and more particularly to cathode-ray tubes of the composite metal-glass type.

An object of the invention is to provide a method of manufacturing a cathode-ray tube envelope the main body portion of which is of metal, and the flared neck portion of which is of glass or other vitreous material.

While the invention is primarily directed to the manufacture of a cathode-ray tube for use in television and similar systems, it is applicable to the manufacture of cathode-ray tubes for use in other fields. However in television systems it is desirable to employ a cathode-ray tube having as large and rugged a screen as possible. While cathode-ray tubes consisting substantially entirely of glass or at least with the flattened end integrally united to the body of the tube have been quite generally used, I have found that this last-mentioned type is not desirable in large size television tubes. One of the reasons is that it is very difficult to control accurately the various dimensions of the tube by ordinary glass blowing methods. Another reason is that for very large screen sizes, the tube is liable to collapse when evacuated.

Accordingly another object of the present invention is to provide a method whereby a rugged cathode-ray tube with a large screen may be manufactured economically and with a high degree of dimensional accuracy.

A feature of the invention relates to the novel method of sealing a flared glass neck to the metal body portion of a cathode-ray tube.

While cathode-ray tubes having a main body of metal are desirable for a number of reasons they require the usual beam deflecting means to be located away from the metal because of the energy loss that would otherwise result, especially where the deflection is effected electromagnetically. Furthermore it is desirable to effect the deflecting action in the flared part of the neck of the tube. If this neck is of glass it requires that the flare be of comparatively large diameter, in many cases several inches at least. I have found that the usual methods of forming and sealing such a large glass flare neck to a metal ring are not desirable either from the viewpoint of economy or from the viewpoint of dimensional accuracy and uniformity. In accordance with the present invention the glass flared neck is preformed, preferably by an accurate glass molding process, to the required shape and dimensions, and is sealed to a special metal sealing ring on a glass working lathe or the like.

Other features and advantages not specifically enumerated will be apparent after a consideration of the following description and the appended claims.

In the drawing,

Fig. 1 is a perspective view of the flared glass neck portion of the tube.

Fig. 2 is a diagrammatic view, partly in section, to explain the method of sealing the glass neck to the metal part of the tube.

Fig. 3 is an elevational view of a completed cathode-ray tube manufactured in accordance with the invention.

Referring to Fig. 3, the tube comprises a substantially flat end 1 of glass or other vitreous material which is designed to act as the viewing screen of the tube. For this purpose, the inner face of the end 1 is provided with any of the fluorescent coatings usually employed in cathode-ray tubes. The end 1 is sealed in a vacuum-tight manner to the main body portion 2 which is preferably of a metal such as steel or the like. For a detailed description of the preferred structure of the end 1 and the manner of sealing it to the portion 2 reference may be had to application Serial No. 82,742. Welded or otherwise vacuum-tight sealed to the reduced end of the body 2 is a metal ring 3 which is also vacuum-tight sealed to the flared glass neck 4 which neck terminates in a substantially cylindrical portion 5. The usual cathode-ray tube electrode mount is then sealed into the end of the portion 5 and after the tube has been evacuated and processed in the usual manner it may have attached thereto the base 6 carrying the requisite contact members or prongs 7.

As pointed out hereinabove it is advisable to locate the cathode beam deflecting means in the vicinity of the glass flare 4 as indicated schematically in Fig. 3 by the arrows. However in order to effect a proper vacuum-tight seal between the flare 4 and the ring 3 it is necessary that the said flare be of accurate dimensions and correspond accurately in diameter and flare to that of the metal sealing ring 3 which is of comparatively rigid metal. Preferably the flare portion 4, at least, of the neck is of Corning 705AJ glass or other similar glass, and the ring 3 is of "Kovar" a metal alloy containing approximately 18% cobalt, 28% nickel and 54% iron. As shown more clearly in Fig. 2 the sealing ring 3 is formed with a frusto-conical portion and with a cylindrical portion 8, the inclination of the frusto-conical portion corresponding accurately to the inclination of the flare 4. In order to insure the proper dimensional accuracy of the flare 4 I have found that this portion of the tube should be preformed, preferably by a molding operation. This molding of the flare may be accomplished in any well-known molding process either by blowing the molten glass into a suitably shaped mold or by pressing it into a mold starting with a molten glass "gather" as is disclosed for example in said application Serial No. 82,742.

The preferred manner of sealing the preformed glass neck to the metal ring 3 is illustrated in Fig. 2. As shown in this figure, the metal sealing ring is removably fastened in a suitable jig comprising a cylindrical cup-shaped section 9 provided with a central shank 10. The depth of the rim 9 is preferably the same as that of the portion 8 of the ring 3 so that when the annular fastening ring 11 is tightened in place by the wingnuts 12, the sealing ring is properly centered and held rigidly in the jig. Preferably also the fastening ring 11 overhangs the rim 9 so as to engage the shouldered part 13 of the sealing ring. The jig carrying the sealing ring is then "chucked" in the head stock of a suitable glass lathe with the jaws 14 of the chuck gripping the shank 10. The flared glass neck is "chucked" in the tail stock of the lathe preferably by the chuck jaws engaging the inside of the portion 1 of the neck. By suitable mechanism (not shown) the head stock may be moved longitudinally and axially with respect to the tail stock and both the head stock and the tail stock are rotated in unison in the same direction.

The lathe head stock is moved longitudinally so as to bring the glass flare 4 in overlapping relation with the cone-shaped portion of ring 3 as shown in Fig. 2, the end of said ring having been previously oxidized by heating it to redness in the flame of the cross-fires 16, which are mounted on a suitable cross slide (not shown) of the lathe. The cross-fires play upon the flared end of the glass neck while the latter is being rotated with the ring 3, and when the glass has reached the proper temperature for example of the order of 700 degrees C., a carbon paddle is pressed against the molten glass so as to roll it down into sealing contact with the metal cone. After the sealing of the flare to the ring has been completed the temperature of the cross fires is lowered to a soft flame so as to anneal the seal. When the seal has cooled, the tail chuck is disengaged and the proper length of the cylindrical glass tubing 5 is sealed to the part 1. This union of the tubing 5 to the part 1 may be effected in any manner well-known in the glass blowing art and if desired the union may be effected on the lathe as described as will be clear to those familiar with the glass blowing art. The part 8 of the sealing ring is assembled in overlapping relation with the constricted end of part 2, after which they may be welded to form a vacuum-tight seal. The envelope is now completed and is ready to receive the usual electrode mount, after which the tube is evacuated and processed in accordance with well-known procedure. The finished tube envelope therefore consists of a flat screen portion of glass, a main body portion of metal, a flared neck portion of glass and an intermediate sealing ring all these parts being sealed in a vacuum-tight manner accurately and expeditiously thus enabling large television tubes to be made in quantity with a high degree of uniformity and ruggedness in the finished tubes.

Various changes and modifications may be made in the method as disclosed without departing from the spirit and scope of the invention. Thus if desired the sealing ring 3 may be welded to the metal cone 2 prior to sealing on the glass flare 4, it being understood that the holding device 9, 11 and 12 will be correspondingly modified to hold the part 2 in the proper position during the sealing of the glass flare as above-described.

What I claim is:

1. The method of manufacturing a cathode-ray tube envelope having a main body portion of metal and a flared glass neck wherein the deflection of the beam takes place which includes the steps of preforming as a separate unit a flared glass tube, sealing the flare of the tube in a vacuum-tight manner to a previously oxidized sealing ring having substantially the same coefficient of expansion as the glass of the flare the sealing being effected by a combined heating and shrinking of the glass around the ring, and welding the sealing ring to a frusto-conical metal member.

2. The method of manufacturing a sealed-off cathode-ray tube of the sectionalized type having in sequence an elongated glass neck, a glass cone, a metal sealing band, a substantially frusto-conical metal body portion and a permanently sealed flat glass window, which includes the steps of preforming the glass cone as a separate element in a molding die, sealing the preformed glass cone to one end of the sealing band, sealing the glass neck to the constricted end of the glass cone, and then welding the other end of the sealing band to the constricted end of said body portion.

3. The method of manufacturing a highly evacuated cathode-ray tube which comprises preforming as separate units the following: a substantially flat glass window; a frusto-conical metal body; a frusto-conical metal sealing ring; a glass flare formed by pressure molding; sealing the ring to the large end of the flare; sealing the window to the large end of the metal body; and welding the ring to the small-end of the metal body.

ROBERT M. BOWIE.